United States Patent [19]

Ishiyama

[11] Patent Number: 4,992,637

[45] Date of Patent: Feb. 12, 1991

[54] HIGH FREQUENCY HEATING SYSTEM AND METHOD THEREOF

[75] Inventor: Kunio Ishiyama, Mobara, Japan

[73] Assignee: Hitachi, Ltd., Japan

[21] Appl. No.: 461,360

[22] Filed: Jan. 5, 1990

[30] Foreign Application Priority Data

Jan. 6, 1989 [JP] Japan ..................................... 64-309

[51] Int. Cl.$^{5}$ ........................ H05B 6/68; H02M 7/537

[52] U.S. Cl. ........................ 219/10.55 B; 219/10.55 M; 363/21; 363/97

[58] Field of Search .................. 219/10.55 B, 10.55 C, 219/10.55 M, 10.55 R; 363/21, 97; 315/102, 103, 104, 105, 106, 107; 328/267, 270

[56] References Cited

U.S. PATENT DOCUMENTS

| | | | |
|---|---|---|---|
| 3,392,309 | 7/1968 | Hickman | 219/10.55 B |
| 4,777,575 | 10/1988 | Yamato et al. | 219/10.55 B |
| 4,866,589 | 9/1989 | Satoo et al. | 219/10.55 B |
| 4,866,590 | 9/1989 | Odaka et al. | 219/10.55 B |
| 4,931,609 | 6/1990 | Aoki | 219/10.55 B |
| 4,933,830 | 6/1990 | Sato et al. | 219/10.55 B X |

FOREIGN PATENT DOCUMENTS 62-107397 7/1987 Japan .

*Primary Examiner*—Philip H. Leung

*Attorney, Agent, or Firm*—Antonelli, Terry, Stout & Kraus

[57] ABSTRACT

A high frequency heating method includes the steps of controlling a closing period of a switching circuit on the basis of a specified magnetron output value and setting the closing period thereof to a predetermined value. A high frequency heating system includes a heating output control circuit for controlling the closing period thereof on the basis of the specified magnetron output value and an initial output limit circuit for controlling the closing period thereof to a predetermined value.

9 Claims, 3 Drawing Sheets

HIGH FREQUENCY HEATING SYSTEM AND METHOD THEREOF

BACKGROUND OF THE INVENTION

1. Field of the Invention

The present invention is generally directed to a high frequency heating system of an inverter power supply type which is intended to reduce the weight of a transformer by effecting the conversion into an alternate current having a higher frequency than that of a commercial power supply. More particularly,the present invention is directed to a high frequency heating system designed to prevent generation of abnormally high voltages for a short period of time before initiating oscillations of a magnetron.

2. Description of the Prior Art

A widely utilized heating system as a domestic cooking machine is a high frequency heating system designed to perform dielectric heating by causing a magnetron to generate microwaves and using outputs of the microwaves. In this type of application, it is of importance to reduce both the weight and size of the system. Therefore, in recent years there has been a tendency to employ an inverter power supply capable of decreasing the step-up transformer size and weight by effecting a conversion into an alternate current having a higher frequency than that of the commercial power supply. In the inverter power supply, if a closing period of a switching element increases, a voltage impressed on an anode of the magnetron rises to increase the output. An opening period of the switching element is determined by a circuit constant -i.e., a value which is substantially constant. Hence, a heating output can be controlled by adjusting the length of the closing period by means of a control circuit for controlling the opening and closing operations of the switching element. Thus, the inverter power supply can be reduced in weight and in size, and the heating output thereof can also be controlled by a relatively easy operation.

A variety of feedback control operations have been performed to stabilize the outputs of the inverter power supply. Turning to FIG. 1, there is illustrated a system for effecting the feedback control by detecting a DC input current value. Referring again to FIG. 1, the numeral 1 designates a rectifier circuit; 2 a step-up transformer; 3 a switching element; 4 a capacitor for resonation; 5 a magnetron; 6 a high voltage capacitor; 7 a diode; 8 a detection probe for detecting a primary current; 20 an output control circuit; and 21 a feedback circuit. FIG. 2 shows a system for carrying out the feedback control by detecting a secondary magnetron anode current of a transformer. In FIG. 2, the same components as those of FIG. 1 are marked with the like numerals. Indicated at 9 is a detection probe for detecting a secondary current. Disclosed in Japanese Utility Model Laid-Open No. 62-107397 is a circuit, depicted in FIG. 3, for feeding back a signal obtained on the secondary side of the magnetron step-up transformer to a control circuit for controlling opening/closing operations of the switching element 3 of an inverter circuit. This circuit is fundamentally based on the same principle as that of the system shown in FIG. 2. Referring to FIG. 3, the same components as those of FIG. 1 are marked with the like numerals. The numeral 10 represents a voltage probe for detecting a secondary voltage.

There arise, however, the following problems inherent in the conventional inverter power supplies based on the systems illustrated in FIGS. 1 to 3. After the magnetron 5 has initiated oscillations, the feedback is normally effected. Before starting the oscillations by the magnetron 5 after starting the power supply, however, supply of electric power, i.e., an electric current is not started, though a high voltage is generated on the secondary side of the step-up transformer 2. Based on the prior art systems discussed above, the feedback circuit 2, though a voltage higher than needed is produced, does not function to control the voltage. For this reason, voltages are generated which are twice or three times as high as the voltage required for the magnetron in the conventional circuits. Consequently, in the prior art systems the components—the magnetron 5, the high voltage transformer 2, the capacitor 6 on the side of the high voltage circuit and the diode 7—have to be designed to exhibit properties resistant to abnormally high voltages as compared with voltages during high frequency heating output.

After starting the power supply, a cathode of the magnetron 5 gradually increases in temperature. After a short time, e.g., 3 sec., has passed, electrons are discharged, at which time the abnormally high anode voltages described above are applied. This hinders the normal oscillations by the magnetron 5, and in some cases an overcurrent flows instantaneously. The abnormally large instantaneous pulse current in turn causes an excessive surge voltage in the high voltage circuit or in the switching circuit. As a result, there exists the probability that the switching elements 3, the high voltage diode 7, the high voltage transformer 2 and further the magnetron 5 will be damaged.

SUMMARY OF THE INVENTION

It is a primary object of the present invention, which is devised to obviate the foregoing problems peculiar to the prior arts, to provide a high frequency heating method wherein: a direct current obtained by rectifying a commercial power supply is converted into an alternate current having a higher frequency than that of a commercial AC power supply by repeatedly effecting switching operations of a switching circuit; a cathode heating voltage and an anode voltage for driving a magnetron are obtained by inputting the alternate current to a transformer, by a method comprising the steps of: controlling a closing period of a switching circuit for repeating the switching operations in accordance with a specified magnetron output value; and setting, to a predetermined value, the closing period of the switching circuit for repeating the switching operations only for a predetermined time depending on a cathode heating property of the magnetron after starting the power supply.

According to one aspect of the invention, there is provided a high frequency heating system in which a direct current obtained by rectifying a commercial power supply is converted into a alternate current having a higher frequency than that of a commercial AC power supply by repeatedly effecting switching operations by use of a switching circuit, and a cathode heating voltage and an anode voltage for driving a magnetron are obtained by inputting the alternate current to a transformer, the system comprising: a heating output control circuit for controlling a closing period of a switching circuit for repeating the switching operations in accordance with a specified magnetron output value; and an initial output limit circuit for controlling a closing period of the switching circuit to a predetermined value for a predetermined time, wherein the switching operations of the switching circuit are controlled by the initial output limit circuit for a perdetermined time depending on a cathode heating property of the magnetron after starting the power supply and by the heating output control circuit after a predetermined time.

In the high frequency heating circuit of the thus constructed system according to the present invention, the predetermined time is set to value of 2 through 10 seconds.

In the high frequency heating circuit of the system, the closing period, set by the initial output limit circuit, of the switching circuit for repeating the switching operations is smaller than the closing period, and controlled by the heating output control circuit of the switching circuit for repeating the switching operations.

In the high frequency heating circuit of the system, the specified magnetron output value corresponds to an anode current of the magnetron.

In the high frequency heating circuit of another system, the specified magnetron output value corresponds to an anode current and an anode voltage of the magnetron.

In accordance with a feedback control system of an inverter power supply of the high frequency heating system of the present invention, the heating output control circuit is separated till a temperature of the cathode of the magnetron reaches a level (approximately 80% of a rated cathode temperature) at which electrons are discharged enough to cause oscillations, and a value of voltage generated in the high voltage circuit is limited nearly to a value of the voltage to be impressed during normal oscillations of the magnetron while controllig the closing period of the switching circuit by use of the initial output control circuit, thereby causing no overvoltage on the secondary side. The magnetron does not oscillate even when the cathode temperature rises in such a state. The oscillations of the magnetron involves the steps of permitting the heating output control circuit to control the opening/closing operations of the switching circuit by changing over the circuit after a predetermined time (longer than a time needs for reachig the cathode temperature at which to discharge a sufficient amount of electrons enough to cause the oscillations), e.g., 4 sec., has passed with the aid of a timer, and increasing the closing period of the switching circuit to generate an anode voltage necessary for producing an inflow of anode current corresponding to a desired output into the magnetron in a normal oscillating state.

BRIEF DESCRIPTON OF THE DRAWINGS

Other objects and advantages of the present invention will become apparent during the following discussion taken in conjunction with the accompanying drawings, in which:

FIGS. 1 to 3 aare circuit diagrams for explaining prior art systems;

DESCRIPTION OF THE PREFERRED EMBODIMENTS

Figure 1:
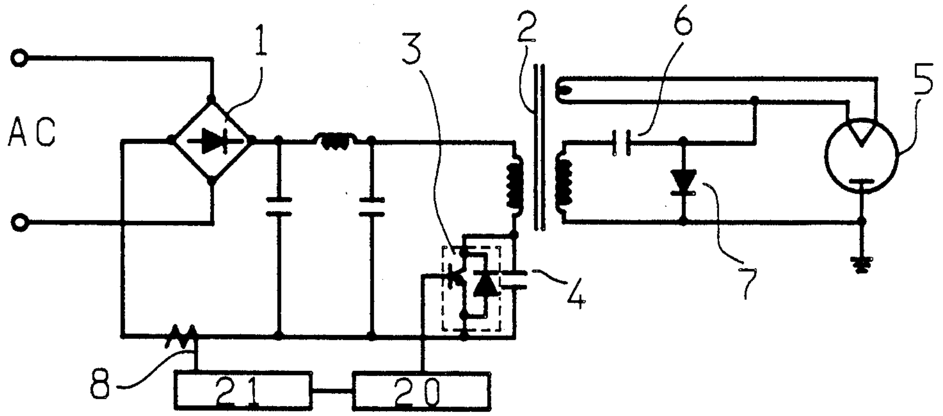
FIG. 1 PRIOR ART
Figure 2:
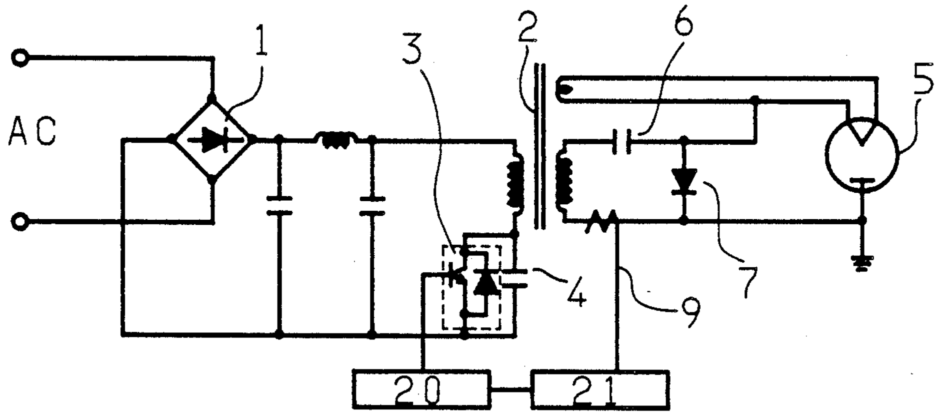
FIG. 2 PRIOR ART
Figure 3:
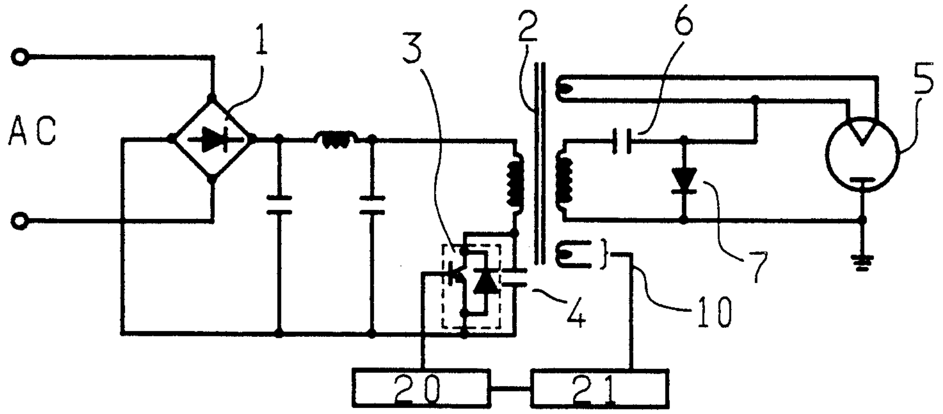
FIG. 3 PRIOR ART
Figure 4:
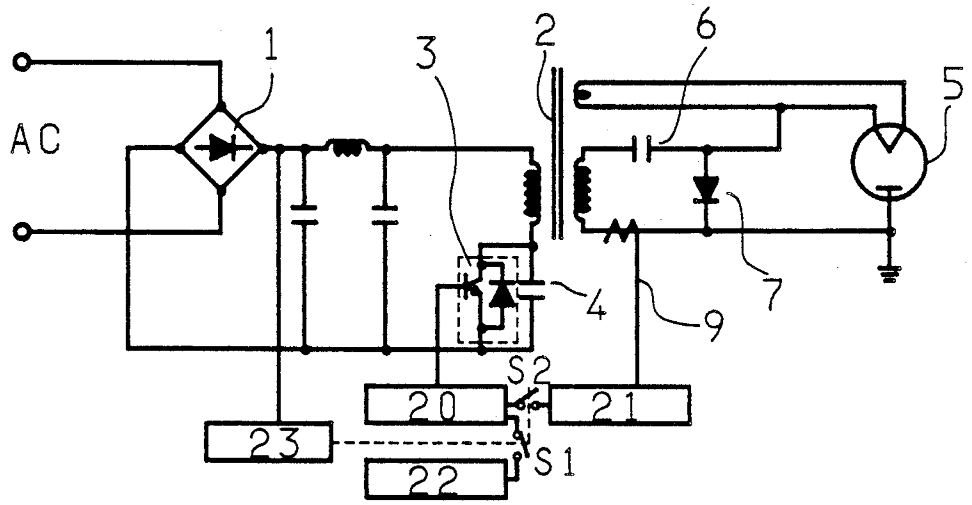
FIG. 4 is a schematic circuit diagram showing a first embodiment of the present invention.

Turning first to FIG. 4, there is illustrated a schematic circuit diagram of a first embodiment of the present invention. The same components as those depicted in FIGS. 1 through 3 are marked with the like numerals. The numeral 22 denotes an output limit circuit, and 23 stands for a timer. When starting a power supply, a switch Sl is closed, whereas a switch S2 is opened. A closing period of a switching element is set short on the basis of an output limit signal transmitted from an initial output limit circuit. Immediately when starting the power supply, the timer functions to open the switch S1 and close the switch S2 after a predetermined time (selected in the vicinity of 5 sec., i.e., within a range of 2 to 10 sec. depending on working conditions) has passed. Control over the closing period of the switching element is then taken over to a heating output control circuit. Note that the switches S1 and S2 are in effect composed of electronic circuits, and the signal voltage (current) for controlling the switching operations of the switching element varies smoothly.

Figure 5:
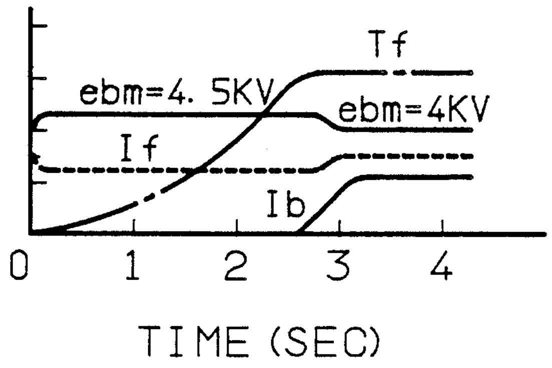
FIG. 5 is a characteristic diagram showing operations according to the present invention.
Figure 6:
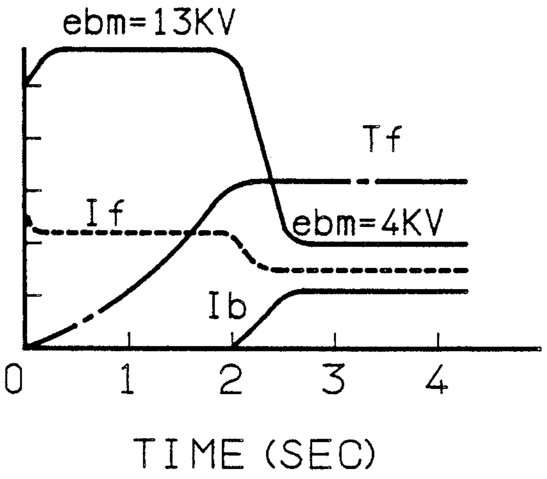
FIG. 6 is a characteristic diagram showing operations based on the prior art system.

Operational characteristics according to the present invention after starting the power supply will be explained with reference to FIGS. 5 and 6 while making a comparison with the prior art system. In these Figures, a symbol $e_{bm}$ represents a magnetron peak voltage; $I_f$ a cathode (filament) current; $T_f$ a cathode (filament) temperature; and $I_b$ a magnetron current (a mean value). Referring to FIG. 6, there is shown a case where the prior art system is employed. The magnetron peak voltage $e_{bm}$ is as high as 13 kV before the magnetron initiates the oscillations after making the power supply. The magnetron current $I_b$ flows concurrently with a rise in the cathode temperature $T_f$, whereby an oscillating state is present. Then, the peak voltage $e_{bm}$ is reduced down to 4 kV (a magnetron operating voltage). FIG. 5 shows a case relative to the present invention. A value of the peak voltage $e_{bm}$ before starting the magnetron oscillations after making the power supply is restrained as low as 4.5 kV (a filament current correspondingly becomes lower than in the prior art system, and the rise in the cathode temperature is retarded).

Where the high frequency heating system of the invention is adopted, it is possible to eliminate the necessity for investing the high voltage parts, the transformer, the diode, the capacitor and the magnetron with properties resistant to the voltages abnormally higher than the voltage at which to feed the microwave power after coming into the oscillating state, thereby preventing an increase in unit price of the component.

Figure 7:
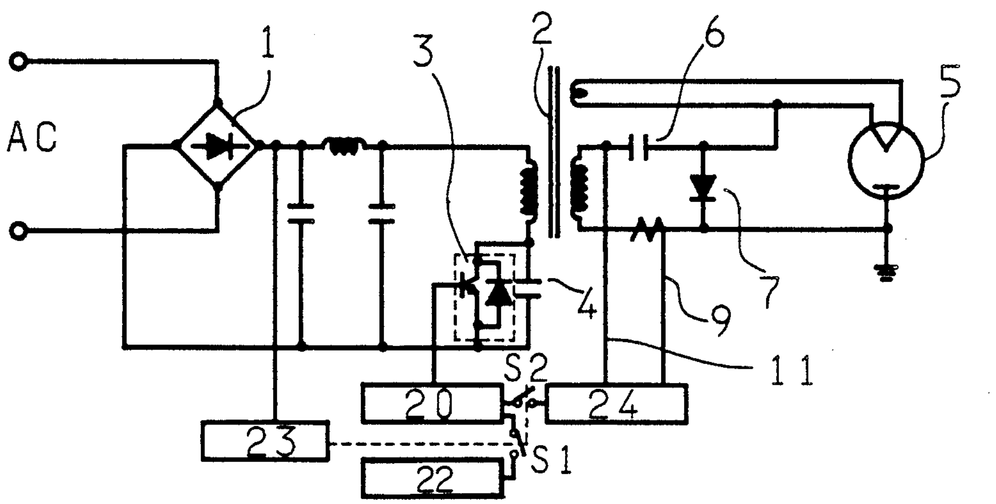
FIG. 7 is a circuit diagram showing a second embodiment of the present invention.

Turning to FIG. 7, there is illustrated a second embodiment of the present invention. In FIG. 7, the same parts as those shown in FIGS. 1 to 4 are marked with the like numerals. The numeral 11 represents a voltage probe for detecting a secondary voltage, and 24 denotes a feedback circuit. The feedback circuit 24 has a function to generate a feedback signal on the basis of an electric power value calculated from the secondary current detected by the current probe 9 and from the secondary voltage detected by the voltage probe 11.

The magnetron increases in temperature during the operation thereof. As the temperature rises, voltage-current characteristics of the magnetron vary. It is therefore required that the secondary current and the secondary voltage as well be detected to effect accurate output control. In accordance with the present invention, the secondary voltage can be restrained as low as, e.g., 4.5 kV or under, and hence it is feasible to detect not only the secondary current but also the secondary voltage, thereby performing the control based on the electric power value.

As discussed above, the voltage resistant properties of the high voltage parts can be reduced down to approximately one-third of those in the prior art systems, thereby eliminating the necessity for investing the high voltage transformer, the high voltage capacitor, the high voltage diode and the magnetron with properties resistant to extremely high voltage. The decrease in the voltage resistant properties serves to get rid of the probability that a surge voltage will be produced due to an overcurrent of the magnetron which is generated, as in the case of the prior art system, when the electron discharge property of the magnetron cathode arises. Moreover, damages to the high voltage parts and to the switching element can be prevented, resulting in a remarkable improvement of reliability.

Although the illustrative embodiments of the present invention have been described with reference to the accompanying drawings, it is to be understood that the present invention is not limited to those precise embodiments. Various changes or modifications may be effected therein by one skilled in the art without departing from the scope or spirit of the invention.

What is claimed is:

1. A switching power source apparatus comprising:
- a transformer having at least a primary winding fed by a DC power source and a secondary winding coupled to a load;
- switching means coupled in series with the primary winding for repating a switching operation in response to an ON signal;
- a capacitor coupled in parallel with said switching means to form a resonant circuit together with said primary winding;
- means for generating said ON signal, said generating means including:
- an output limit control means for producing a first control signal;
- means for detecting a secondary current of said transformer and producing an output signal indicative thereof;
- feedback circuit means, responsive to said output signal, for producing a second control signal;
- control circuit means, responsive to said first and second control signals, for periodically producing said ON signal so as to cause said switching means to be conductive;
- timer means for generating a timing signal at a predetermined time after said DC power source is energized;
- first switch means, responsive to said timing signal, for connecting said output limit control means and said control circuit means; and
- second switch means, responsive to said timing signal, for connecting said feedback circuit means and said control circuit means.

2. An apparatus according to claim 1, wherein said first switch means closes when said DC power source is energized, said first switch means opens in response to said timing signal, and said second switch means closes in response to said timing signal.

3. An apparatus as defined in claim 1, wherein said predetermined time of said timer means is between two and ten seconds after said DC power source is energized.

4. A high frequency heating system, comprising:
- a transformer having at least a primary winding fed by a DC power source and a secondary winding coupled to a magnetron;
- switching means coupled in series with the primary winding for repeating a switching operation in response to an ON signal;
- a capacitor coupled in parallel with said switching means to form a resonant circuit together with said primary winding;
- means for generating said ON signal, said generating means including:
- an output limit control means for producing a first control signal;
- means for detecting a secondary current of said transformer and producing an output signal indicative thereof;
- feedback circuit means, responsive to said output signal, for producing a second control signal;
- control circuit means, responsive to said first and second control signals, for periodically producing said ON signal so as to cause said switching means to be conductive;
- timer means for generating a timing signal at a predetermined time after said DC power source is energized;
- first switch means, responsive to said timing signal, for connecting said output limit control means and said control circuit means; and
- second switch means, responsive to said timing signal, for connecting said feedback circuit means and said control circuit means.

5. A system according to claim 4, wherein said detecting means detects an anode current of said magnetron.

6. A system according to claim 4, wherein said detecting means detects an anode current and an anode voltage of said magnetron.

7. A method for operating a switching power source apparatus, said switching power source apparatus including a transformer having at least a primary winding fed by a DC power source and a secondary winding coupled to a load; switching means coupled in series with the primary winding for repeating a switching operation in response to an ON signal; a capacitor coupled in parallel with said switching means to form a resonant circuit together with said primary winding; and control means for controlling the operation of said switching means, said method comprising the steps of:
- producing a first control signal;
- detecting a secondary current of said transformer and producing an output signal indicative thereof;
- producing a second control signal in response to the output signal indicative of the secondary current of said transformer;
- selectively supplying said control means with said first and second control signals, said control means periodically producing said ON signal so as to cause said switching means to be conductive; and
- generating a timing signal at a predetermined time after said DC power source is energized, said timing signal causing a selected one of said first and second control signals to be supplied to said control means.

8. A method according to claim 7, wherein said timing signal causes said second control signal to be supplied to said control means and prevents said first control signal from being supplied to said cotnrol means.

9. A method according to claim 7, wherein said predetermined time is between 2 and 10 seconds after said DC power source is energized.

* * * * *